G. J. HENDRICKS.
Sheep Rack.

No. 49,520.

Patented Aug. 22, 1865.

UNITED STATES PATENT OFFICE.

G. J. HENDRICKS, OF PARIS, PENNSYLVANIA.

IMPROVEMENT IN SHEEP-RACKS.

Specification forming part of Letters Patent No. 49,520, dated August 22, 1865.

*To all whom it may concern:*

Be it known that I, G. J. HENDRICKS, of Paris, Washington county, State of Pennsylvania, have invented a new and useful Improvement in Sheep-Racks; and I do hereby declare that the following is a full, clear, and exact description thereof, reference being had to the accompanying drawings, making a part of this specification, in which—

Figure 1:
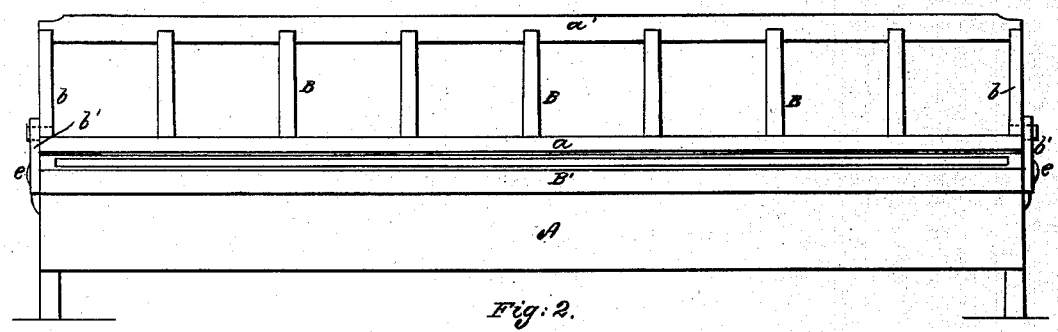
Figure 2:
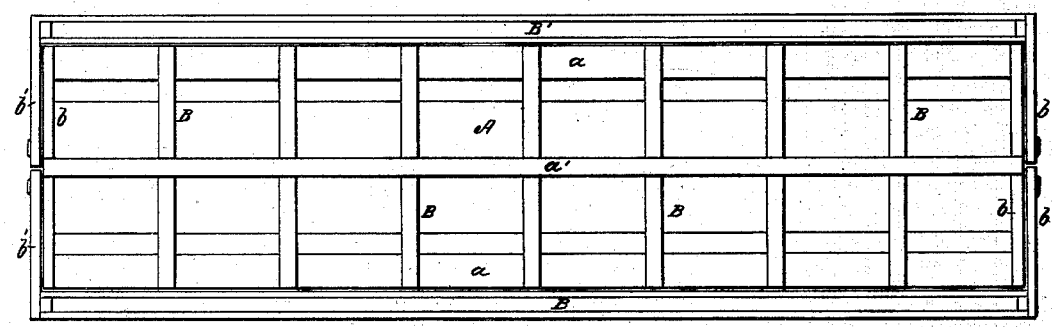
Figure 3:
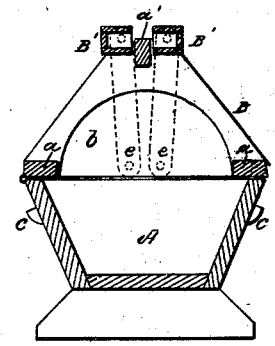
Figure 4:
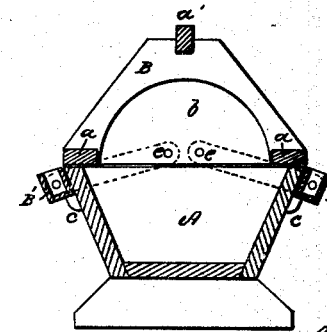

Figure 1 is an elevation of one side of a sheep-rack having my invention applied to it. Fig. 2 is a top view. Fig. 3 is a vertical cross-section of the rack, showing the troughs thrown up. Fig. 4 is a similar view, showing the troughs in a position for use.

Similar letters of reference indicate corresponding parts in the several figures.

The object of this invention is to provide a sheep-rack with one or more grain-troughs, which are so applied that they can be thrown up out of the way, when they are not in immediate use, for the purpose of emptying the grain left by the sheep into the main trough, and also preventing the troughs from accumulating rubbish or snow, as will be hereinafter described.

To enable others skilled in the art to understand my invention, I will describe its construction and operation.

In the accompanying drawings, A represents a trough, which may be made of any desired capacity, and which is provided with a rack that forms a number of stalls, with partitions for preventing one sheep from interfering with another during the feeding. The rack is composed of transverse arched partitions B B, which are secured to longitudinal rails $a$ $a'$ $a$, that extend from one end to the other of the trough and are framed to solid ends $b$ $b$. The rack thus constructed is hinged to one side of the trough A, as shown in Figs. 3 and 4, so that this rack can be lifted up when it is desired to fill the trough with straw or other feed, or when it is desired to clean the trough.

B' B' represent small troughs, which are equal in length to the length of the trough A and its rack. These troughs are pivoted to arms $b'$ $b'$, which are of sufficient length to allow the troughs B' B' to be arranged in the two positions represented in Figs. 3 and 4. The arms $b'$ $b'$ are pivoted at $e$ $e$ to the ends $b$ $b$ of the rack, and allow the troughs B' B' to be moved freely from the position shown in Fig. 3 to that shown in Fig. 4, and vice versa. When the troughs B' B' are in the position shown in Fig. 4 they are supported upon ledges $c$ $c$, and when these troughs are thrown up to the position shown in Fig. 3 they deposit their contents into the main trough A and assume a partially-inverted position, which prevents water, snow, or other foreign substance from getting into them.

It will be seen from the above description that the grain-troughs are permanently attached to the rack, and that when they are not in immediate use they can be moved up out of the way and at the same time emptied of the grain which was not eaten by the sheep.

I have applied the grain-troughs to a hinged rack and hay-trough, but do not confine my invention to a rack thus constructed, as the troughs may be applied to racks of any of the well-known forms.

It is obvious that one trough only will be required when a rack having only one row of stalls is employed.

Having thus described my invention, what I claim as new, and desire to secure by Letters Patent, is—

A sheep-feeding rack constructed with one or more troughs, B' B', on its outside, said troughs being hinged by arms $b'$ $b'$, so as to be adjusted to the positions shown in Figs. 3 and 4 of the drawings, substantially as and for the purpose set forth.

G. J. HENDRICKS.

Witnesses:
NICHOLAS CRISS,
JAMES MAHONY.